United States Patent [19]
Moser

[11] 3,973,298
[45] Aug. 10, 1976

[54] TIE DOWN BRACKETS FOR FLEXIBLE MEMBERS

[76] Inventor: Willard W. Moser, Box 1503, Guymon, Okla. 73942

[22] Filed: Apr. 3, 1975

[21] Appl. No.: 564,806

Related U.S. Application Data

[63] Continuation-in-part of Ser. No. 431,205, Jan. 7, 1974, Pat. No. 3,889,321.

[52] U.S. Cl. .................................. 24/146; 24/147; 24/236; 24/115 K
[51] Int. Cl.² ........................ A43C 3/0; B21D 53/46
[58] Field of Search............ 24/115 K, 257, 4, 73 A, 24/255, 67.3, 146, 147, 144, 236; 248/499, 510, 305, 353, 65, 74 A

[56] References Cited
UNITED STATES PATENTS

| | | | |
|---|---|---|---|
| 291,633 | 1/1884 | Shaw.................................. | 248/353 |
| 778,215 | 12/1904 | Breckenridge...................... | 248/353 |
| 880,251 | 2/1908 | Stimpson ............................. | 24/146 |
| 1,199,373 | 9/1916 | Hagelstein ...................... | 24/255 GP |
| 1,325,202 | 12/1919 | Lawson............................... | 248/305 |
| 2,461,607 | 2/1949 | Kuff.................................... | 248/353 |
| 2,746,112 | 5/1956 | Simon................................ | 248/74 A |
| 3,430,904 | 3/1969 | Soltysik............................. | 248/74 A |

FOREIGN PATENTS OR APPLICATIONS

| | | | |
|---|---|---|---|
| 142,007 | 7/1903 | Germany........................... | 24/255 P |
| 1,123,232 | 8/1968 | United Kingdom............... | 24/73 SA |

Primary Examiner—Bernard A. Gelak
Attorney, Agent, or Firm—Laney, Dougherty, Hessin & Fish

[57] ABSTRACT

A tie down bracket for receiving and engaging a bight or loop in a flexible member, such as a rope or cable, such tie down bracket including a base plate having secured thereto a spring mounting body. The spring mounting body includes a projecting finger which cooperates with a spring mounted on the body. The spring defines with the base plate an opening adjacent the finger for receiving and retaining the bight or loop of the flexible member.

5 Claims, 6 Drawing Figures

TIE DOWN BRACKETS FOR FLEXIBLE MEMBERS

CROSS REFERENCE TO RELATED APPLICATION

This application is a continuation-in-part of U.S. patent application Ser. No. 431,205 filed Jan. 7, 1974, now U.S. Patent Ser. No. 3,889,321.

BACKGROUND OF THE INVENTION

1. Field of the Invention

This invention relates to brackets or clips used to easily receive and tenaciously retain a loop or bight portion of a cord, rope, cable or other flexible member. More particularly, the invention relates to brackets particularly adapted for mounting on the sides of trucks or similar vehicles for retaining the ropes or lines used to secure a tarpaulin over the top of the cargo-carrying portion of such vehicles.

2. Brief Description of the Prior Art

In the transport of cargo in large, open-topped trucks and similar vehicles, it is customary practice to cover the cargo with a removable tarpaulin or similar flexible covering structure. The side edges of the tarpaulin are secured in position after covering the cargo by extending ropes or similar flexible lines from certain points along the side edges of the tarpaulin to a plurality of positions of anchorage along the side walls of the truck. For purposes of anchoring or securing the ropes, it has been conventional practice to provide a cleat or similar rigid structure having projecting fingers or toes beneath which the bights or loops of the rope are passed prior to tensioning. A difficulty frequently encountered with this type of securing or anchoring means is that the rope employed for securing the tarpaulin often develops slack or looseness after an extended period of road travel with characteristic vibration, and the loops, by reason of sagging of the rope, pass free of the anchoring cleats or similar structure, and thus no anchoring function continues to be rendered by these devices.

In other types of anchoring structures or brackets employed for securing the bight portions of ropes, a latching mechanism is sometimes employed which is complicated to operate, and requires digital manipulation in order to open the bracket to receive the bight of the rope or the flexible member, followed by further digital manipulation to lock the bracket in place around or over the bight of the rope. In a few instances, the brackets used employ rigid eyes through which the rope must first be threaded in order to place the bight in position in the eye, thus necessitating a free end of the rope which can be manipulated to effect initial threading of the rope through the eye. Where such free end is not available and only the bight is accessible, such devices have no utility, since there is no way to place the bight within the rigid eye.

BRIEF DESCRIPTION OF THE PRESENT INVENTION

The present invention provides an improved tie down bracket for quickly and easily receiving the bight portions or loops formed in ropes which are to be drawn taut from an anchor point established at the point of the bracket. The brackets of the invention are simple in construction, but are reliable in use, and can be employed by unskilled personnel having ordinary digital facility.

Broadly described, the tie down bracket of the invention comprises a base plate adapted for securement to a supporting surface, and having mounted thereon a solid spring mounting or supporting body. The spring supporting body includes a projecting retaining finger which is spaced from the base plate. Spring means is mounted on the spring supporting body between the finger and the base plate and provides guide surfaces inclined away from the base plate. In some types of mounting of the bracket, it is possible to eliminate the base plate from the structure.

In the use of the tie down brackets of the invention, a bight or loop portion of a flexible member, such as a rope, is guided beneath the portion of the spring means between the finger and the base plate by initial contact with a surface of the spring means inclined away from the base plate. As a result of the resiliency of the spring means, the bight can be snapped into the space defined between the finger and the base plate. The flexible member is retained in this position by the confining physical limitation to movement constituted by the spring means and thus cannot be released from the tie down bracket at such time as slackness may develop in the flexible member.

An important object of the invention is to provide a tie down bracket which is relatively simple in construction, includes few principle parts and which is mechanically sturdy and therefore characterized in having a long and trouble-free operating life.

A further object of the invention is to provide a tie down bracket capable of functioning as an anchoring device for securing the loop or bight portion of an elongated flexible member, such as a rope, and to retain such loop or bight portion in a fixed location, even though the rope is slackened and relieved from a status of tension.

An additional object of the invention is to provide a tie down bracket which is simply constructed so that inexperienced personnel having no more than average perception and mechanical ability can use the bracket without experiencing difficulty, and without failing to understand how the flexible member is to be secured by means of the bracket.

Additional objects and advantages will become apparent as the following detailed description of a preferred embodiment of the invention is read in conjunction with the accompanying drawings which illustrate the invention.

DETAILED DESCRIPTION OF PREFERRED EMBODIMENT OF THE INVENTION

Figure 1:
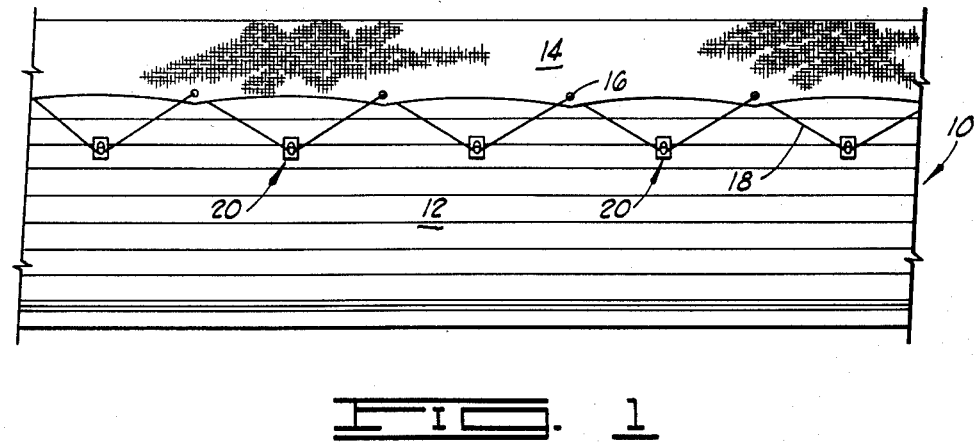
FIG. 1 is a side elevation view showing a portion of an open-topped, cargo-carrying truck, and illustrating a tarpaulin being positioned over the open top of the truck bed and secured in this position by means of a rope which is anchored or tied down by means of the tie down brackets of the present invention.

Referring initially to FIG. 1 of the drawings, shown therein is a portion of a truck bed designated generally by reference numeral 10 and including side boards 12 forming the side of the bed. A type of truck of which a portion is illustrated in FIG. 1 is an open-topped truck adapted to carry cargo protected by a tarpaulin or similar protective member, and such tarpaulin is designated by reference numeral 14. As is conventional construction, the tarpaulin is provided with plurality of grommet lined eyes or apertures 16 for the purpose of receiving an elongated flexible member, such as a rope 18, which is extended along the side edge of the tarpaulin. The rope 18 is anchored and maintained in tension by providing a series of loops or bights between the grommetted eyes 16 and spaced below the side edge of the tarp, with these loops or bights being engaged by some type of anchoring structure or bracket.

Figures 2, 3, 4:
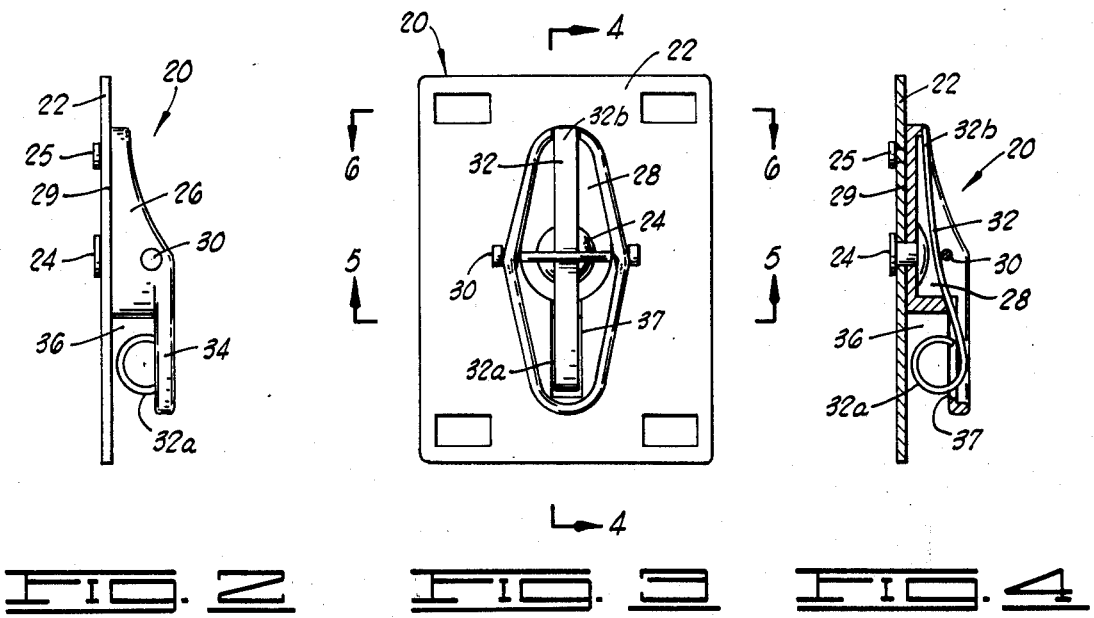
FIG. 2 is a side elevational view illustrating the tie down bracket of the present invention as such bracket appears when viewed from the side thereof.
FIG. 3. is a front elevation view of the tie down bracket shown in FIG. 2.
FIG. 4 is a sectional view taken along line 4—4 of FIG. 3.
Figures 5, 6:
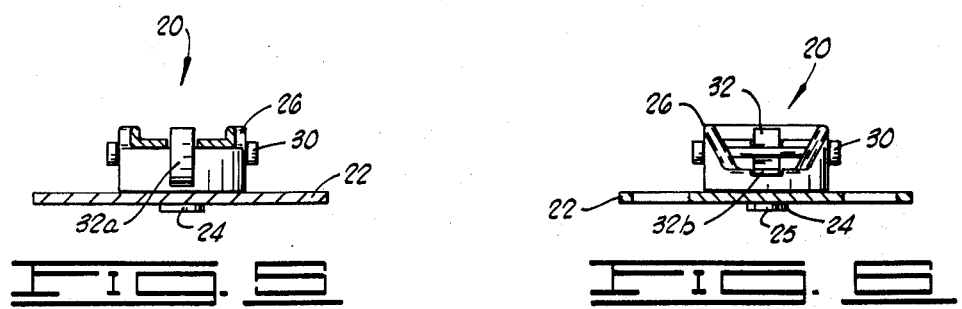
FIG. 5 is a sectional view taken along line 5—5 of FIG. 3.
FIG. 6 is a sectional view taken along line 6—6 of FIG. 3.

In FIG. 1 of the drawings, the tie down brackets of the present invention are illustrated as in use for engaging and anchoring the bights of the rope 18 and are designated generally by reference numeral 20. The details of structure of the tie down bracket 20 of the invention are illustrated in FIGS. 2-6. As here shown, the tie down bracket 20 preferably includes a base plate 22 which is apertured to allow bolts, screws or other fastening devices to be extended therethrough. The base plate 22 has mounted thereon by means of a first rivet 24 or other suitable fastening device, and also a second rivet 25 or bolt, a spring supporting body 26. The spring supporting body 26 includes a dished-out central portion 28 which is arcuately shaped to provide an exposed surface curving outwardly from the base plate 22 toward a central portion of the body, which central portion is the thickest portion of the body. The spring supporting body 26 has a flat back surface 29 which abuts the base plate 22. At the central portion of the body 26, a retainer pin 30 is extended through opposed portions of the body defining the dished-out central portion 28, and this pin 30 retains an elongated, flat metallic spring plate 32. The body 27 further includes a projecting retainer finger 34 which projects substantially horizontally to the base plate 22 and to the flat back surface 29 and defines with the base plate a retainer space 36. As best shown in FIGS. 3 and 4, an opening 37 is provided in the retainer finger 34 through which the spring plate 32 extends. The end portion 32a of the spring plate 32 which extends through the opening 37 in the finger 34 is formed into a convolution which projects into the space 36 between the finger 34 and the base plate 22. As best shown in FIG. 4, the convoluted end portion 32a of the spring plate 32 is preferably formed in a substantially circular shape when viewed from the side so that a pair of guide surfaces inclined away from the base plate in opposite directions are provided thereby, one facing the interior of the retainer space 36 and the other facing outwardly from the space 36. As will be understood, the end portion 32a can be oblong, triangular or of other shape so long as oppositely facing guide surfaces inclined away from the base plate are provided whereby when a flexible member forceably contacts either of the surfaces the end 32a of the spring plate 32 is caused to be moved in a direction away from the base plate 22. Still referring to FIG. 4, it will be noted that the other end 32b of the spring plate 32 bears against the supporting body 26 with an intermediate portion of the spring plate passing beneath and bearing against the retainer pin 30.

In utilizing the tie down bracket 20 of the invention, the bight of a rope or other flexible member is first passed over the retainer finger 34 into contact with the end portion 32a of the spring plate 32. The rope is then pulled so as to force the bight against and beneath the spring plate 32 at the point where the spring plate 32 is closest to the base plate 22. The rope is tensioned so that the bight portion is drawn into the retainer space 36 between the retaining finger 34 of the spring supporting body 26 and the base plate 22. In the use of the tie down brackets 20 for securing the side edges of a tarpaulin 14 over cargo carried in a truck, a series of the tie down brackets are secured in spaced relation along the side of the truck by extending suitable fastening members (not shown) through the openings or apertures 23 formed in the base plate 22. A series of bights formed in the rope or flexible member between the grommetted eyes 16 of the tarpaulin are then placed in anchored or secured position in the spaces 36 formed beneath the retaining fingers 34 of each of the tie down brackets 20, and the rope is then tensioned by pulling on one end of it to draw the tarp down tightly to the status illustrated in FIG. 1.

It should also be pointed out that in some occasional uses, the base plate 22 can be eliminated and the spring supporting body riveted or otherwise fastened to the side of a truck or other flat supporting surface.

Although certain preferred embodiments of the invention have been herein described in order to illustrate the basic principles upon which the invention is based, it will be understood that some variations and changes in the actual and specific structures illustrated and described in referring to such specific embodiments may be effected without departure from these basic principles. Changes and innovations of this type are therefore deemed to be circumscribed by the spirit and scope of the invention, except as the same may be necessarily limited by the appended claims or reasonable equivalents thereof.

What is claimed is:

1. A tie down bracket for engaging a bight in a flexible member comprising:
    a base plate;
    a spring supporting body secured to said base plate and having
    a dished-out central portion;
    an arcuate surface curving upwardly from one end of said spring supporting body toward said dished-out central portion, and curving away from said base plate toward said central portion of said spring supporting body; and
    a retainer finger projecting from said dished-out central portion on the opposite side thereof from said arcuate surface whereby said dished-out central portion of said spring supporting body is located between the arcuate surface and said retainer finger, said retainer finger being spaced from, and defining, a retainer space with said base plate, and having an opening therethrough communicating with said retainer space; and
    a spring plate mounted on said body and having a first portion positioned in the dished-out central portion of said body, and further having a convoluted portion extending through said opening in said retainer finger and across said retainer space between the retainer finger and said base plate, said convoluted portion of said spring plate forming a pair of guide surfaces inclined away from said base plate in opposite directions, one guide surface facing the interior of said retainer space and the other guide surface facing exteriorly thereof.

2. A tie down bracket as defined in claim 1 wherein said retainer finger extends substantially parallel to said plate as a cantilever with respect to the remaining portion of said body.

3. A tie down bracket as defined in claim 1 and further characterized as including a retainer pin extended through said body over said dished-out central portion and said spring plate for retaining said spring plate on said body.

4. A tie down bracket as defined in claim 3 wherein said convoluted portion of said spring plate is of substantial circular shape when viewed from a side thereof.

5. A tie down bracket for engaging a bight in a flexible member comprising:
- a spring supporting body adapted for securement to a base structure and including
- a flat back surface for abutting contact with a substantially monoplanar surface of such base structure upon which said spring supporting body is mounted;
- a dished-out central portion;
- an arcuately shaped surface tapering from said dished-out central portion to an end portion of said body which is relatively thinner than said dished-out central portion as measured along lines extending substantially perpendicular to said flat back surface of said spring supporting body; and
- an elongated retainer finger projecting as a cantilever from said dished-out central portion on the opposite side of said dished-out central portion from said arcuate surface, said finger extending substantially parallel to the plane of said flat back surface, and being spaced from said plane in a direction substantially normal to said plane, said retainer finger having an opening extending therethrough and spaced from said dished-out central portion;
- a spring plate having a portion positioned in the dished-out central portion of said body and further having a portion projecting along said retainer finger and downwardly through the opening in said retainer finger to a position of maximum extension from the retainer finger which is adjacent the plane in which said flat back surface of said spring supporting body lies, said last mentioned portion of said spring plate including a pair of interconnected guide surfaces inclined away from said plane in opposite directions; and
- retainer pin means extended through said spring supporting body and retaining said spring plate on said body.

* * * * *